(12) United States Patent
Lee et al.

(10) Patent No.: US 12,000,928 B2
(45) Date of Patent: Jun. 4, 2024

(54) JOINT FREQUENCY-AND-PHASE MODULATION FOR MULTI-ANTENNA BACKSCATTER VEHICULAR POSITION

(71) Applicant: LG Electronics Inc., Seoul (KR)

(72) Inventors: Seungmin Lee, Seoul (KR); Seungwoo Ko, Seoul (KR); Kaifeng Han, Seoul (KR); Kaibin Huang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 17/434,596

(22) PCT Filed: Mar. 2, 2020

(86) PCT No.: PCT/KR2020/002977
§ 371 (c)(1),
(2) Date: Aug. 27, 2021

(87) PCT Pub. No.: WO2020/180077
PCT Pub. Date: Sep. 10, 2020

(65) Prior Publication Data
US 2022/0120893 A1 Apr. 21, 2022

Related U.S. Application Data

(60) Provisional application No. 62/812,889, filed on Mar. 1, 2019.

(51) Int. Cl.
*H04L 27/10* (2006.01)
*G01S 13/931* (2020.01)
(Continued)

(52) U.S. Cl.
CPC .............. *G01S 13/931* (2013.01); *H04B 5/77* (2024.01); *H04L 5/0023* (2013.01); *H04L 27/10* (2013.01); *H04L 27/18* (2013.01); *H04W 4/023* (2013.01)

(58) Field of Classification Search
CPC ...... G01S 13/931; G01S 13/751; G01S 13/84; G01S 13/878; G01S 2013/9316;
(Continued)

(56) References Cited

U.S. PATENT DOCUMENTS 5,852,630 A * 12/1998 Langberg ............ H04L 27/2647
375/219
8,188,908 B2 5/2012 Landt
(Continued)

FOREIGN PATENT DOCUMENTS

KR 20120012943 A 2/2012
WO 2017033486 A1 3/2017

*Primary Examiner* — Siu M Lee
(74) *Attorney, Agent, or Firm* — BRYAN CAVE LEIGHTON PAISNER LLP

(57) ABSTRACT

The method of performing a positioning of a first apparatus by the first apparatus, transmitting a first signal to a second apparatus through at least one antenna; receiving a second signal from the second apparatus through each of the at least one antenna, wherein the second signal includes a bit related with a tag identifier(ID) of the second apparatus; obtaining the tag ID of the second apparatus, which is related with absolute location information of the second apparatus, based on the bit; and performing the positioning of the first apparatus, based on the first signal, the second signal, and the tag ID of the second apparatus.

14 Claims, 26 Drawing Sheets

(51) Int. Cl.
*H04B 5/77* (2024.01)
*H04L 5/00* (2006.01)
*H04L 27/18* (2006.01)
*H04W 4/02* (2018.01)

(58) Field of Classification Search
CPC ......... G01S 2013/9325; H04B 5/0062; H04L 5/0005; H04L 5/0007; H04L 5/001; H04L 5/0023; H04L 5/0048; H04L 5/0053; H04L 5/0057; H04L 27/10; H04L 27/18; H04W 4/023; H04W 4/40; H04W 4/80
See application file for complete search history.

(56) References Cited

U.S. PATENT DOCUMENTS

| | | | |
|---|---|---|---|
| 8,284,027 B2 | 10/2012 | Kazunari et al. | |
| 2005/0246092 A1* | 11/2005 | Moscatiello | G01S 5/0072 340/539.13 |
| 2006/0292984 A1* | 12/2006 | Teate | G08G 1/123 455/41.2 |
| 2008/0154712 A1* | 6/2008 | Wellman | G06Q 10/0639 705/7.26 |
| 2008/0284600 A1* | 11/2008 | Drzaic | G01S 13/75 340/572.1 |
| 2009/0212921 A1 | 8/2009 | Wild et al. | |

\* cited by examiner

FIG. 4
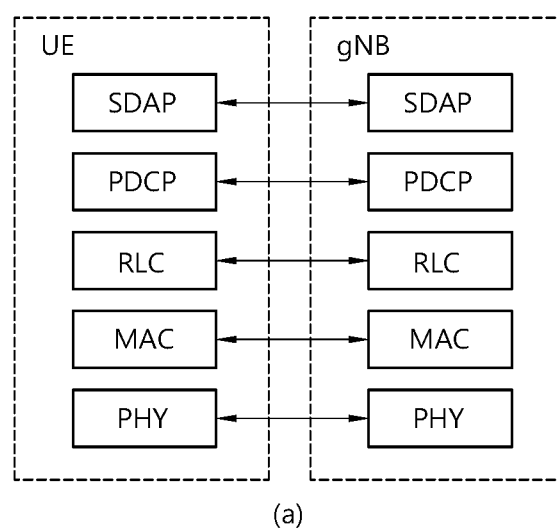
(a)
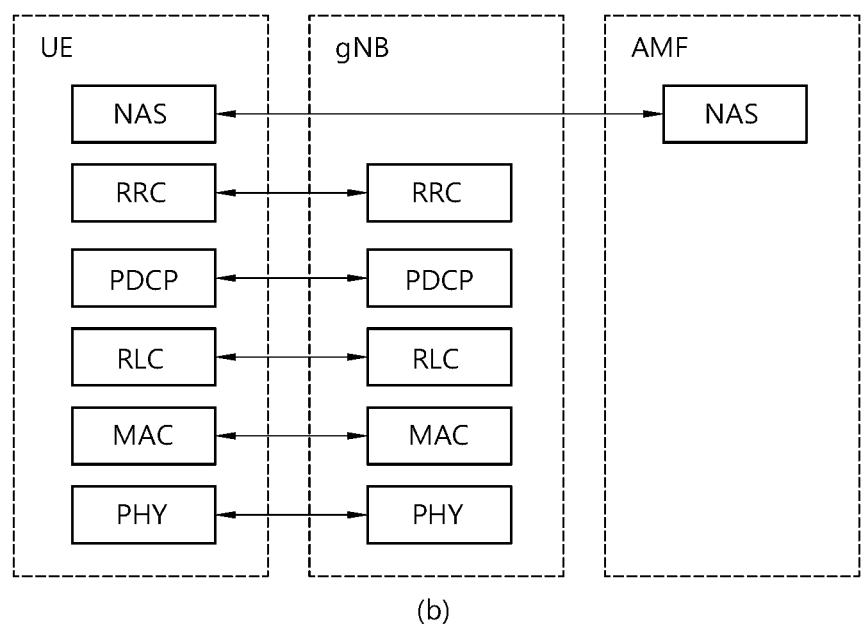
(b)

FIG. 8
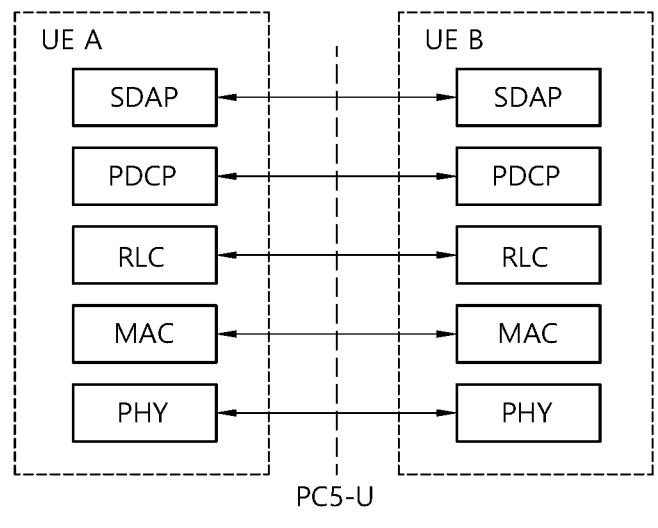
(a)
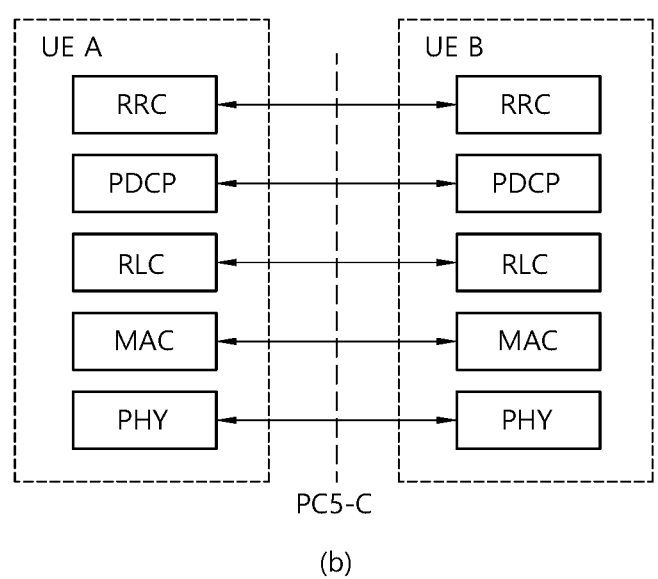
(b)

JOINT FREQUENCY-AND-PHASE MODULATION FOR MULTI-ANTENNA BACKSCATTER VEHICULAR POSITION

This application is a National Stage filing under 35 U.S.C. 371 of International Application No. PCT/KR2020/002977, filed on Mar. 2, 2020, which claims the benefit of Korean Patent Application No. 62/812889, filed on Mar. 1, 2019, the contents of which are all hereby incorporated by reference herein in their entirety.

BACKGROUND OF THE DISCLOSURE

Field of the disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

A first apparatus transmits a first signal to a second apparatus, receives a second signal from the second apparatus, performs a positioning of the first apparatus based on the first signal and the second signal.

Effects of the Disclosure

A first apparatus may accurately perform positioning of the first apparatus.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
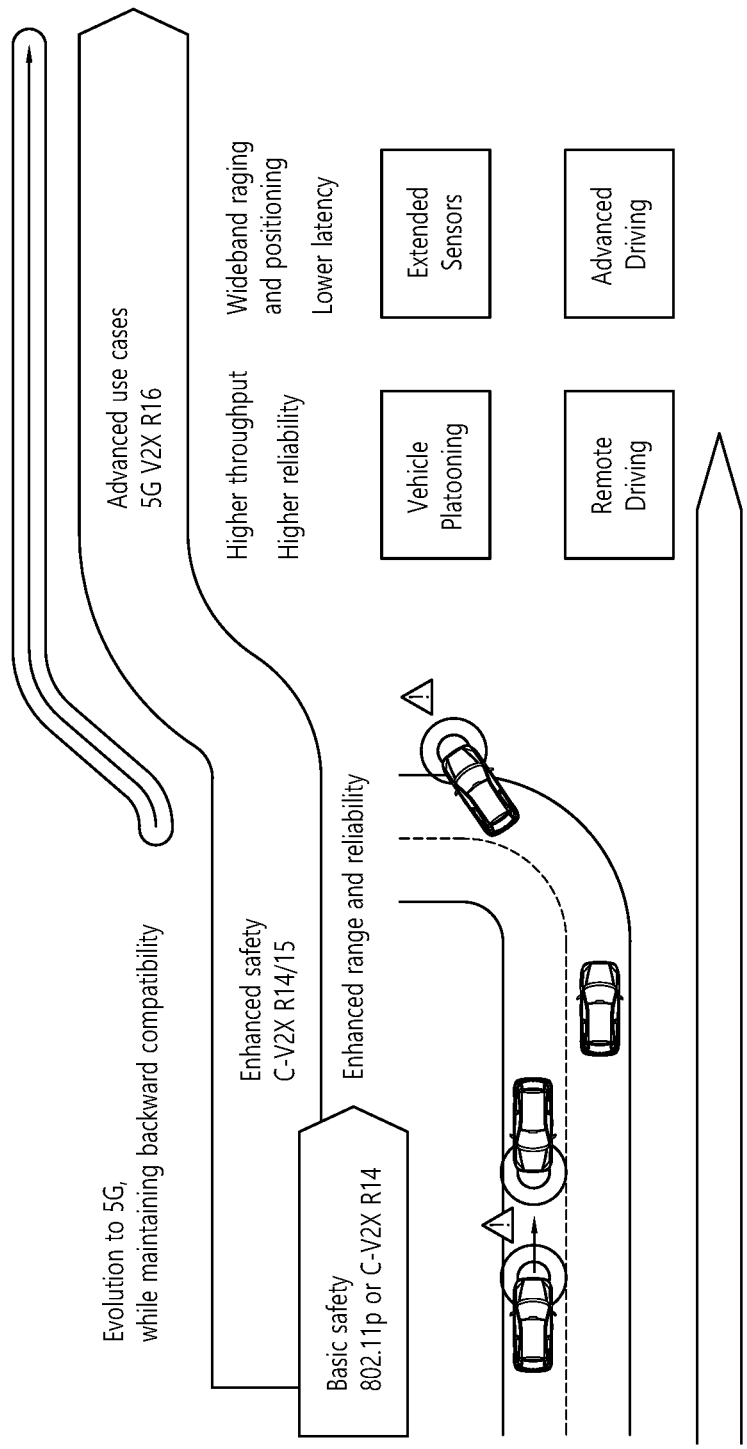
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
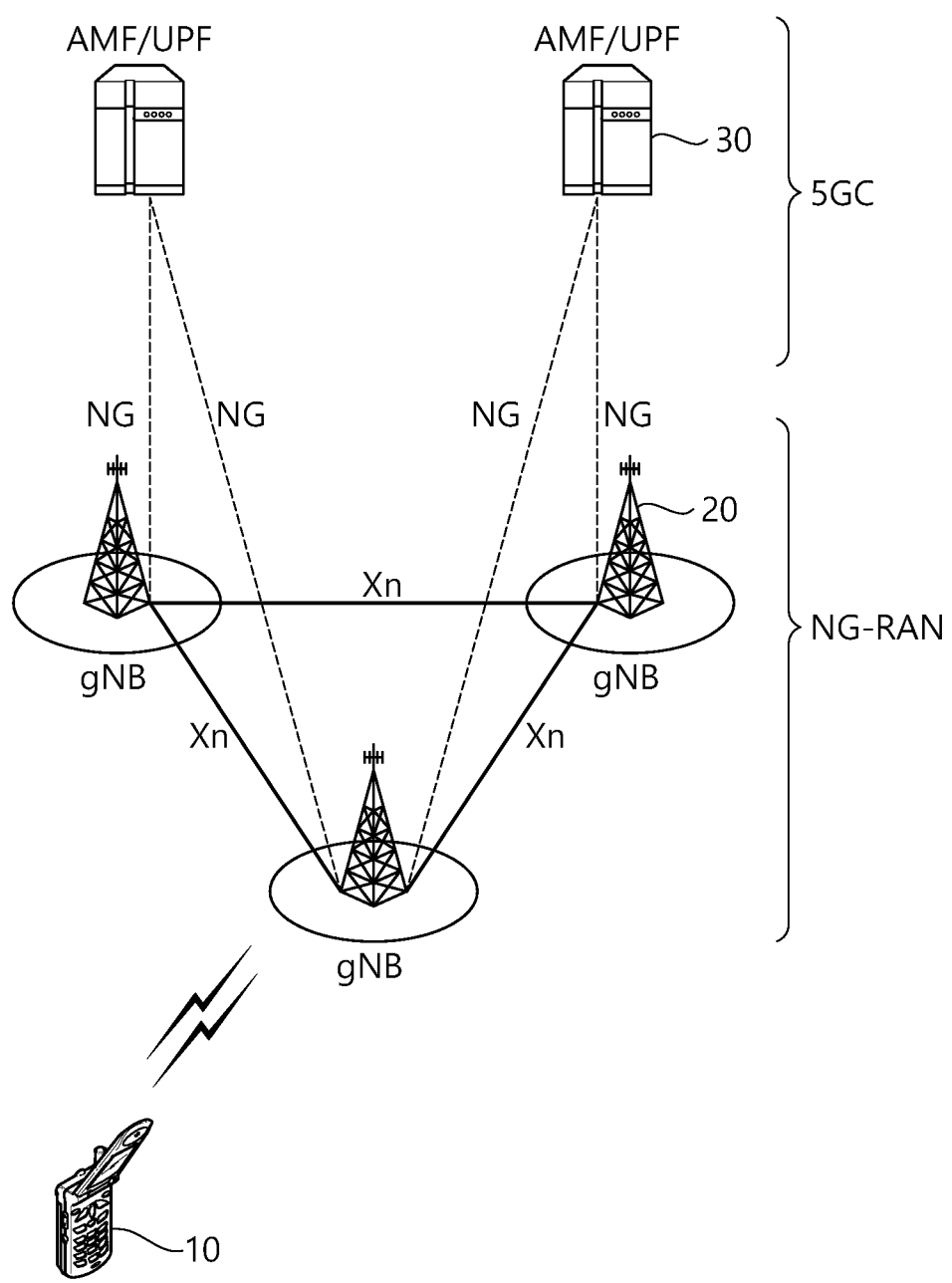
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
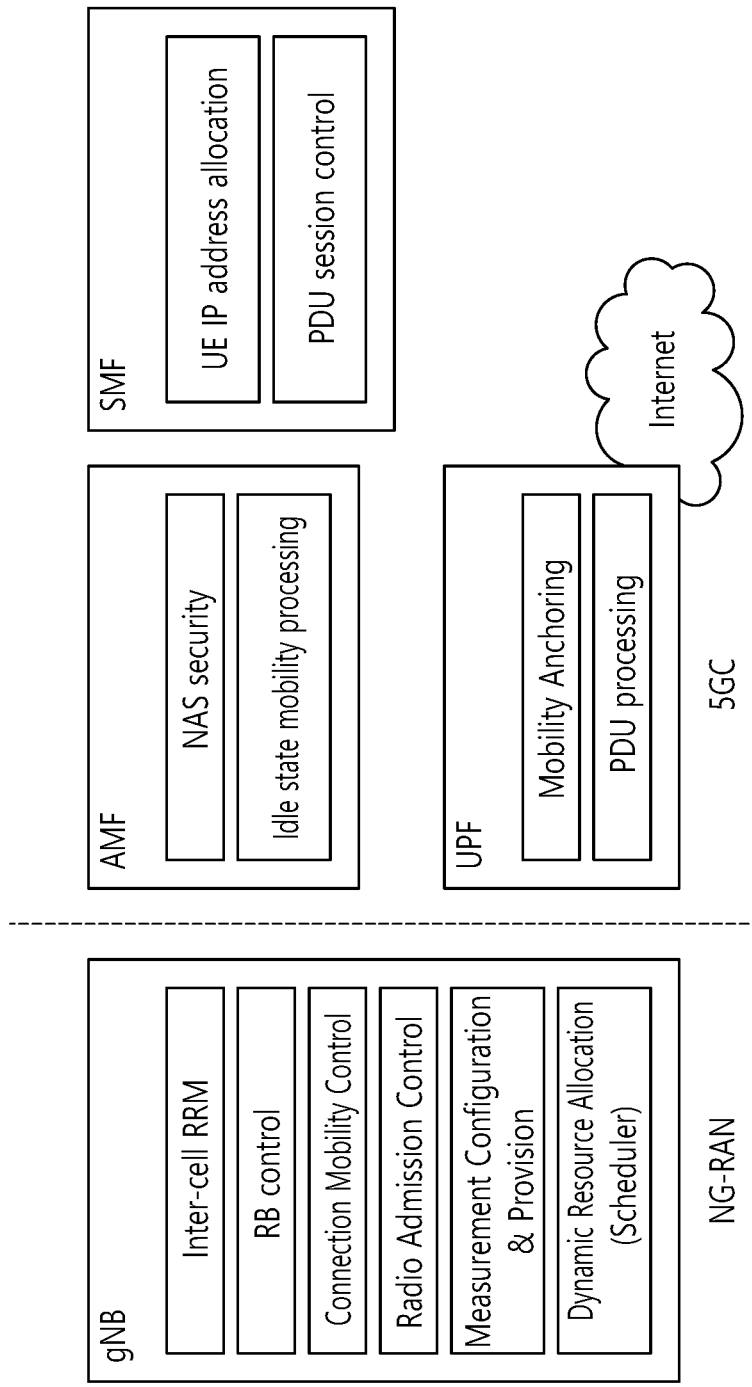
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink- SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
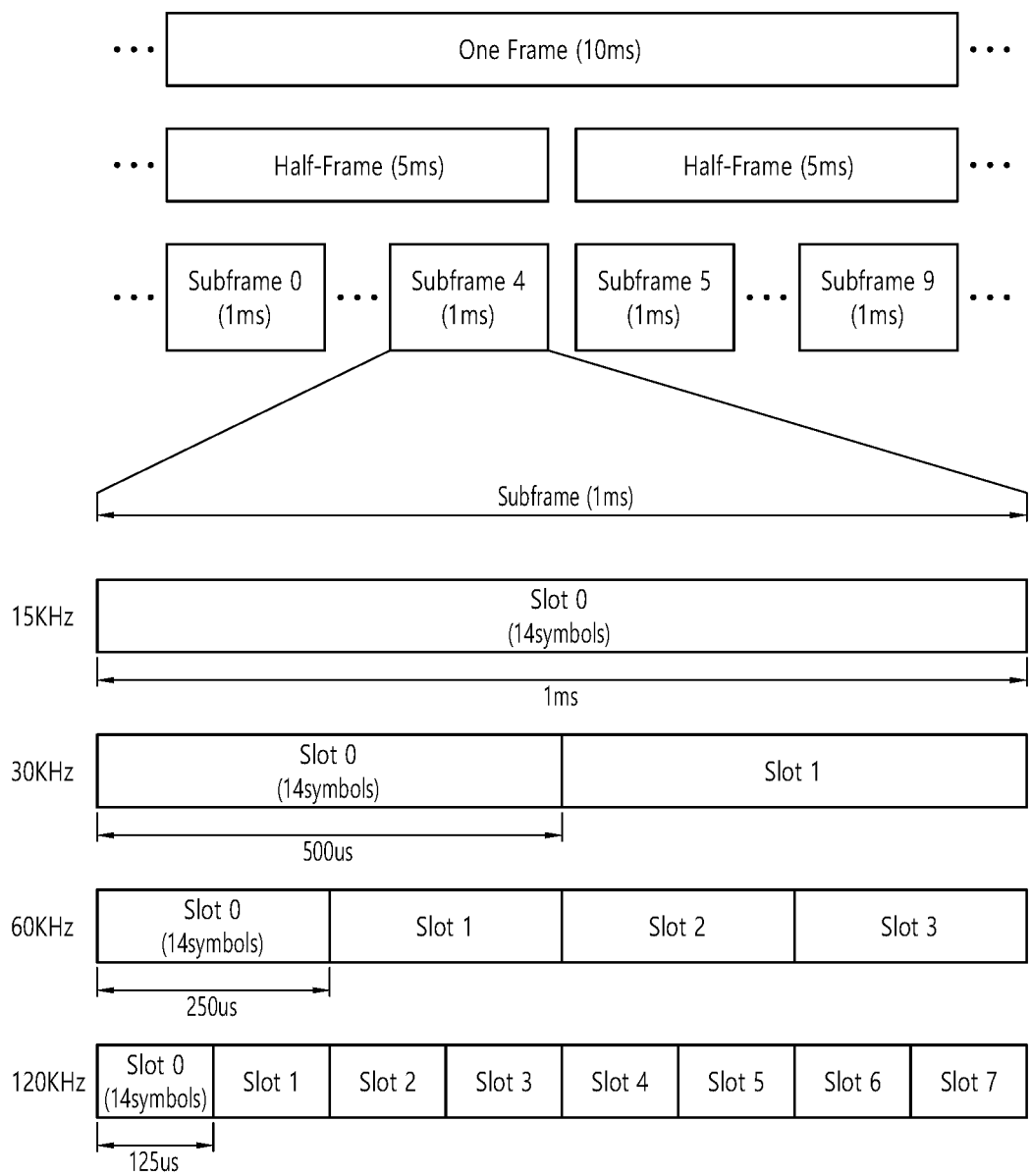
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{symb}$), in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
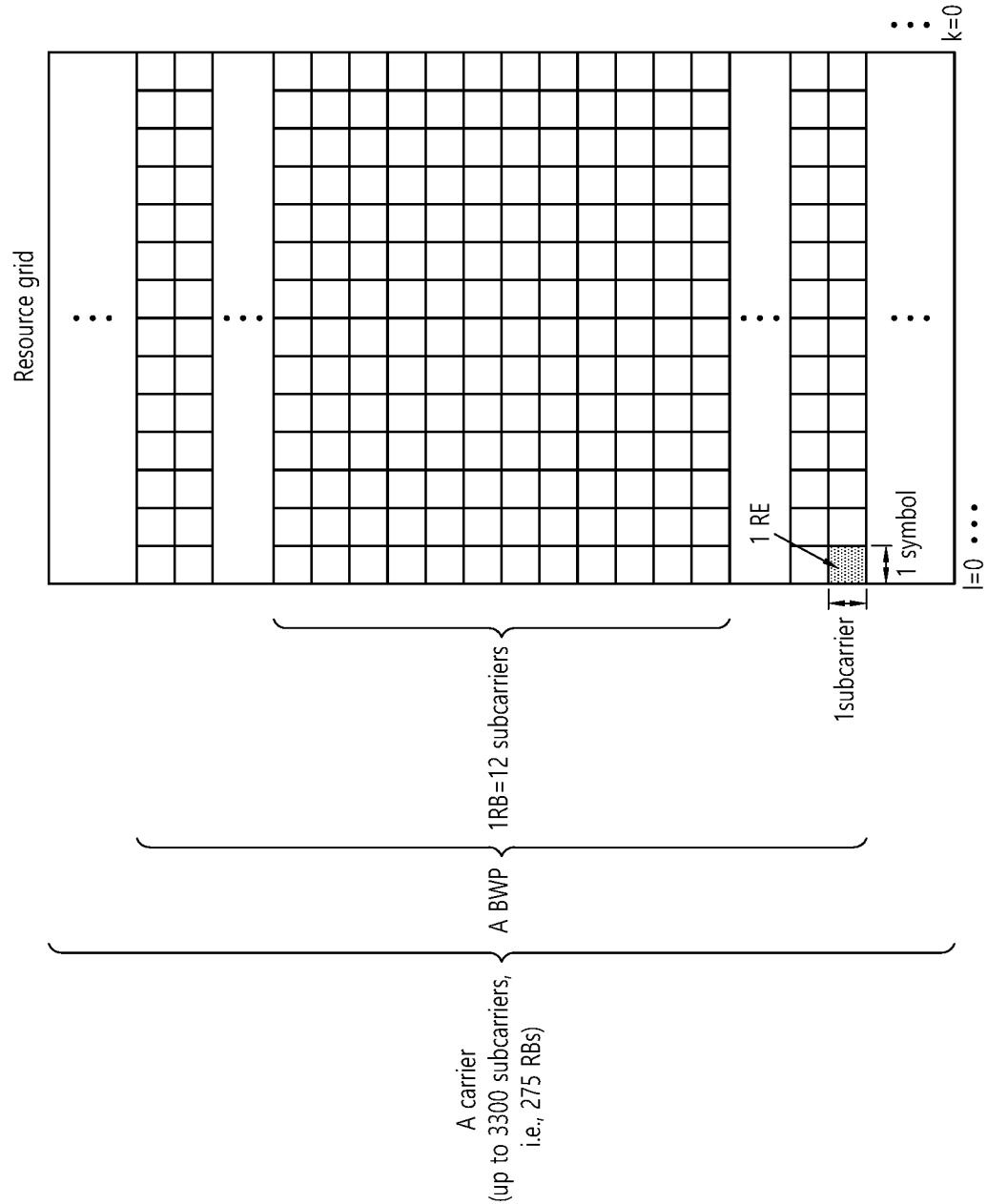
FIG. 6 shows a structure of a slot of an NR frame, in accordance with an embodiment of the present disclosure.

FIG. 6 shows a structure of a slot of an NR frame, in accordance with an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
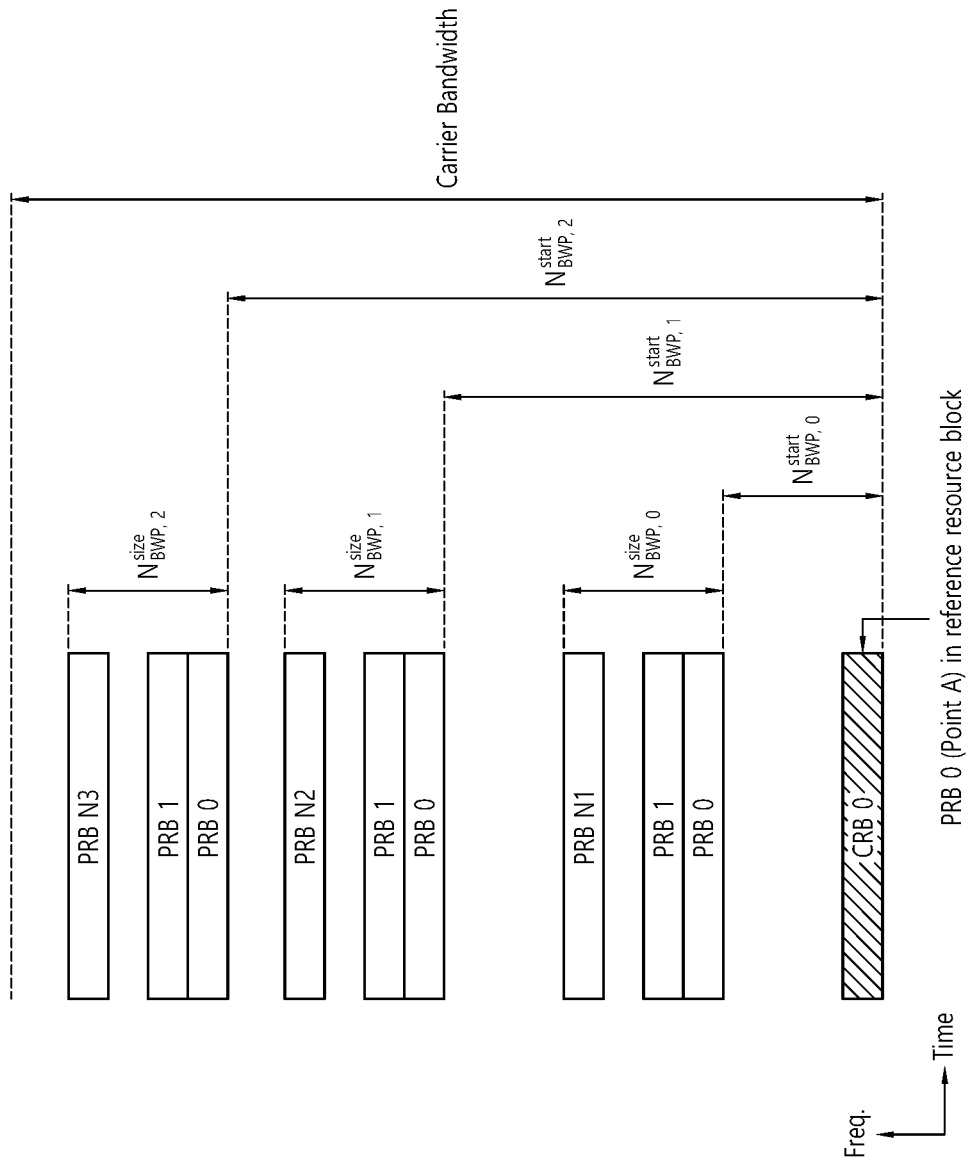
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(*a*) shows a user plane protocol stack, and FIG. 8(*b*) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
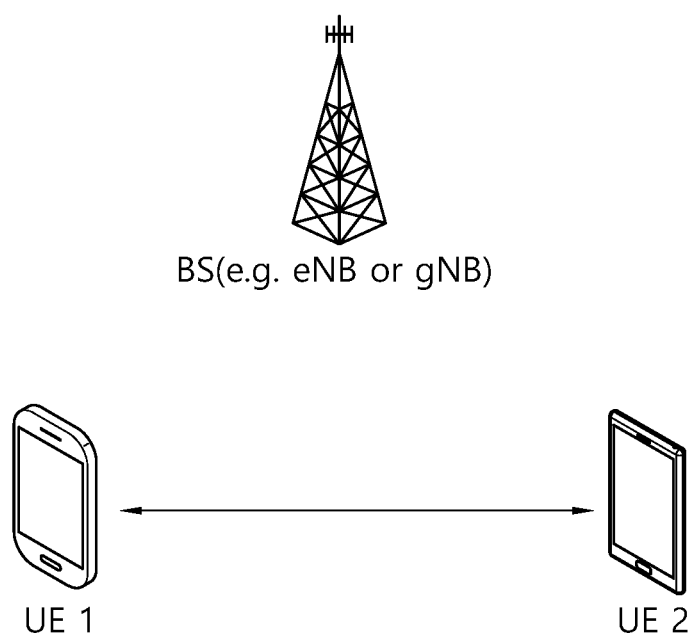
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
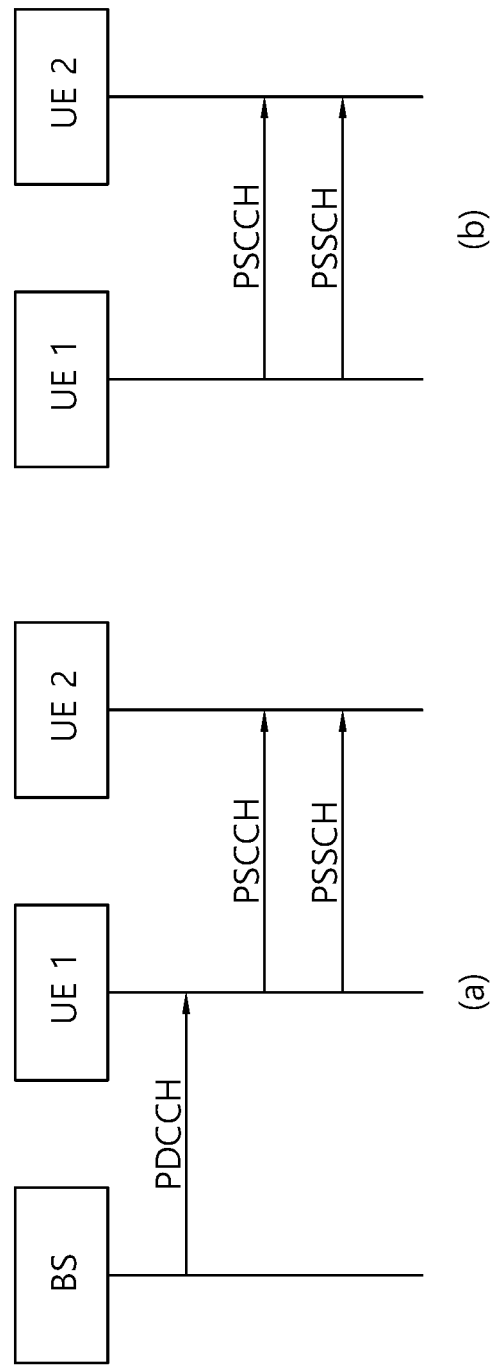
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
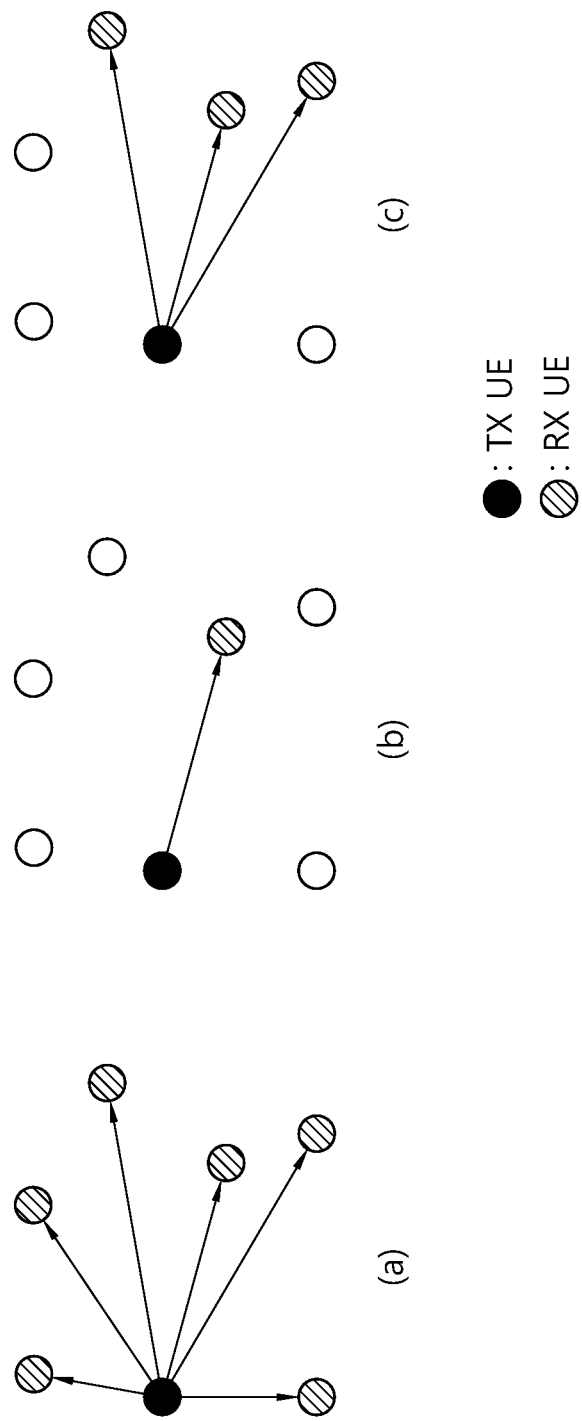
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

To recognize the vehicles' locations, termed vehicular positioning is a fundamental function for safer auto-driving. The state of art of vehicular positioning is to rely on anchors that are stationary objects whose locations are known, i.e. satellites for GPS and base stations for cellular positioning. To install anchors densely, helping find enough anchors nearby may be important for reliable positioning. But for the deployment to be cost-effective, there are some trials to use backscatter tags as alternative anchors by deploying them on a road surface. But its gain may be limited by several reasons such as short contact time and difficulties in maintenance. Instead, this disclosure propose a new backscatter vehicular positioning system, which may enable the extension of contact duration and facilitates the maintenance. For example, the tags may be deployed along a roadside.

Meanwhile, there may be a problem of a location mismatch between the vehicle and the tag, calling for developing a new backscatter transmission to compensate the difference. Therefore, hereinafter, based on an embodiment of the present disclosure, a method of a joint frequency-and-phase modulation for multi-antenna backscatter vehicular positioning and an apparatus supporting the method will be described.

Figure 12:
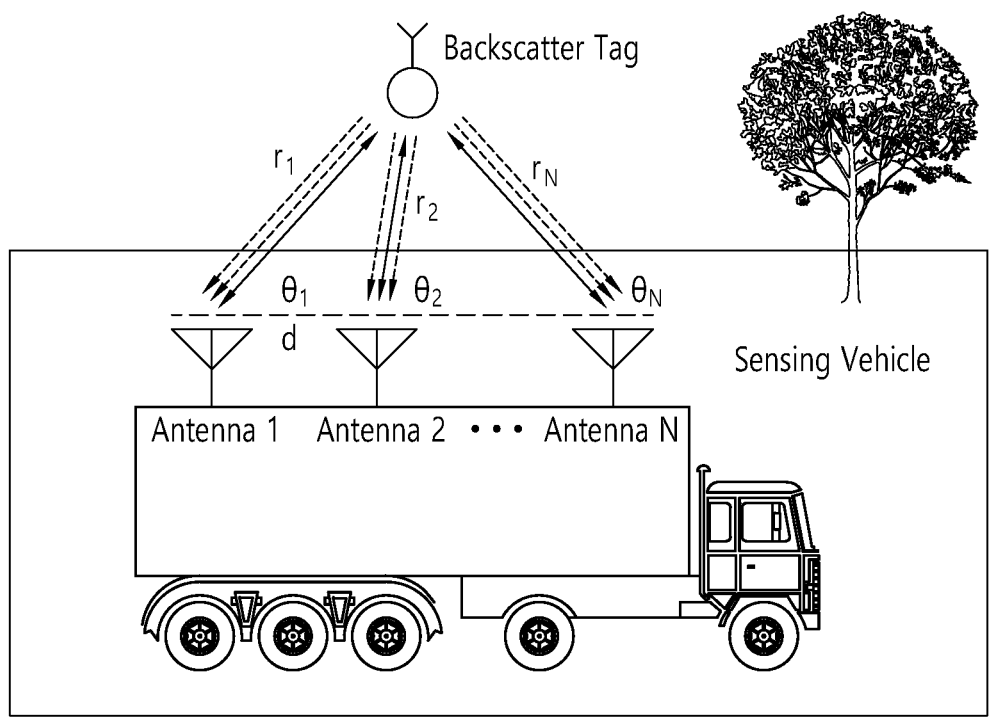
FIG. 12 shows Multi-antenna backscatter vehicular positioning.

FIG. 12 shows Multi-antenna backscatter vehicular positioning. A sensing vehicle with at least one antenna transmits/receives signals with a backscatter tag.

Backscatter radio, a.k.a. Radio-Frequency Identification (RFID), may enable a tag to deliver information by backscattering and modulating an incident radio-frequency (RF) wave. It may be possible to manufacture them with small form factors and low costs, relative to anchors. For example, RFID may be classified as low/high frequency (LF/HF) RFID and ultra-high frequency (UHF) RFID. For example, working principle of LF/HF RFID may be inductive coupling (near field coupling), of UHF RFID may be electromagnetic coupling (far field coupling). For example, a RFID reader may transmit a signal to a RFID tag, and the RFID tag receives the signal and absorbs the signal's energy. The RFID tag activates its own circuit and transmit another signal back to the RFID reader with the RFID tags own data. For example, the another signal may have a frequency and a phase which are same with that of the signal transmitted by the RFID reader. For example, a modification may or may not be possible depending on the type of the RFID tag.

One example is to deploy backscatter tags on road surface such that when moving on the tag, a vehicle may be able to read the tag's identification which is equivalent to the corresponding position. However, this approach may have some limitations in practice as follows. First, a vehicle with high velocity may frequently fail to read tags' information because of the short contact duration. Second, the tags on the road surfaces may likely to be fragile and their maintenances may be difficult since heavy vehicles frequently press the tags.

This disclosure considers a new backscatter positioning system where backscatter tags are deployed along a roadside (see FIG. 12). For example, contrary to the on-road tag deployment, the distance between the tag and the vehicle may become longer, enabling to extend the contact duration according to the tag's cone-shape coverage and recent advance in long-range backscatter transmission. Besides, tags may be expected to be more durable because vehicles do not pass over them. On the other hand, the location of the tag may not correspond to that of vehicle, and their location difference may be required together along with the tag's location. This is challenging in the backscatter system due to the tag's primitive signal processing capability and passive operation. To this end, this disclosure describes a novel waveform called joint frequency-and-phase modulation (JFPM) for the backscatter positioning to ensure the estimation of all distances between vehicle's antennas and the reader embedded in the corresponding individual signal paths. A frequency of the incident wave may be modulated for the distance estimation. For example, the estimation may be under the key assumption that the relevant signal is observable without interference, which can be realized by phase modulation. Given the JFPM, the multi-antenna backscatter channel can be fully exploited to provide the maximum Degree-of-Freedoms (DoFs), may leading to the improvement of positioning accuracy.

Hereinafter, a backscatter vehicular positioning system with its signal model will be described.

For example, a backscatter vehicular positioning system may comprises a backscatter tag deployed along a roadside and a reader-mounted sensing vehicle equipped with N antennas with 'd' inter-antenna spacing (see FIG. 12). For example, the backscatter tag may embed a binary sequence as its tag identification (tag ID) that has been associated with its absolute position. The reader on the vehicle may obtain the tag-ID for a positioning. For example, the vehicle may obtain the tag-ID via backscatter communication based on ON/OFF keying, where two load impedances of the tag's antenna switch with mismatch (reflective) or match (absorptive) states to transmit '1' or '0' bit, respectively. Besides to the tag's absolute location, backscatter ranging may be required to obtain the vehicle's absolute position. For example, it may provide the vehicle's relative position with respect to the tag by measuring the distances between antennas and the tag. To this end, all N antennas may simultaneously transmit a JFPM waveform signal to the tag. Due to the nature of backscatter channels, each antenna may receive up to N signals originated from not only itself but also the other antennas, providing in total $N^2$ DoFs, each of which may embed its propagation distance explained in the sequel. Therefore, it's important to exploit the maximum DoF to help distance estimations between the N antennas and the tag, which may contribute to a more accurate positioning result.

Figure 13:
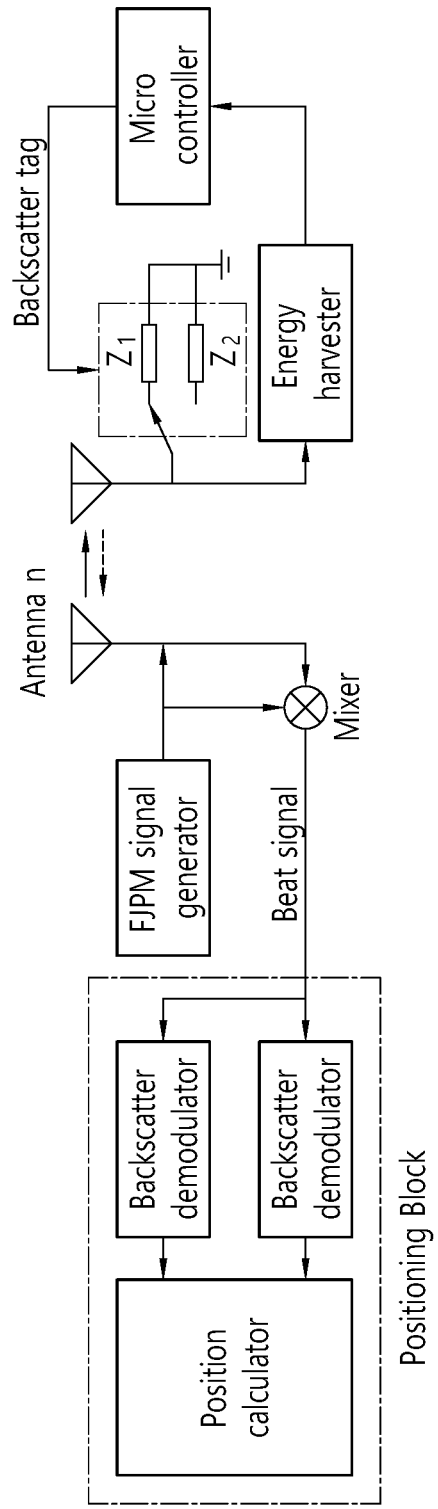
FIG. 13 shows an example of design of backscatter vehicular positioning system.

FIG. 13 shows an example of design of backscatter vehicular positioning system. For example, the architecture of the backscatter vehicular positioning system is illustrated in FIG. 13 with the following three-step signal model.

1) Transmit Signal at the Reader:

For an example, time may be slotted into L frames called sweeps. The period of each sweep is T and the total period is LT. Obtaining the n-th antenna's JFPM waveform within the l-th sweep ($l \in \{1, 2, \ldots, L\}$) may be based on an Equation 1.

$$x_n(t, l) = e^{j(F(t) + P_n(l))}, 0 \leq t \leq T \quad \text{[Equation 1]}$$

$F(t)$ and $P_n(l)$ may denote frequency and phase modulation functions, respectively. For example, each antenna may use an equivalent frequency modulation function but a different phase modulation function due to their roles' difference. For example, the difference in phase modulation function may be a phase modulation rate. Specifically, for example, $F(t)$ may allow the reader to estimate signals' propagation distances in a frequency domain if they are differentiable. For example, $P_n(l)$ may help the differentiation in a phase domain. The different forms of $F(t)$ and $P_n(l)$ will be proposed in the below which are depending on the concerned driving scenarios with low or high mobility.

2) Backscattered Signal:

For an example, the received signal at the n-th antenna may be a non-coherent combination of multiple backscatter signals originated from all N antennas including both monostatic and bistatic signals. Obtaining the received signal may be based on Equation 2.

$$y_n(t, l) = \sum_{m=1}^{N} A_{m,n} \cdot b \cdot x_m(t - \tau_{m,n}, l) + w_n \quad \text{[Equation 2]}$$

$A_{m,n}$ may denote the signal attenuation of the received signal originated from antenna m. For example, monostatic signals may be initially transmitted from an antenna, and bistatic signals may be initially transmitted from at least one other antenna. The binary coefficient $b \in \{0, 1\}$ may refer to the transmitted bit of the tag's ON/OFF keying, $\tau_{m,n}$ may denote propagation time from n-th transmit antenna via the tag to the n-th receive antenna, and $w_n$ may be the additive white Gaussian noise (AWGN) following $CN(\mathbf{0}, \sigma_{noise}^2)$. For example, as shown in FIG. 12, the relative distance and angle between the tag and the n-th antenna may be denoted by $r_n$ and $\theta_n \in [0, \pi]$, respectively. Obtaining the propagation time $\tau_{m,n}$ in Equation 2 may be based on Equation 3.

$$\tau_{m,n} = \frac{r_m + r_n}{c} + \frac{v(\cos\theta_n + \cos\theta_m)(t + (l-1)T)}{c} \quad \text{[Equation 3]}$$

c may be speed of signal propagation and the second term may represent the distortion due to the vehicle's velocity v resulting in Doppler shift.

3) Beat Signal:

For an example, the transmitted and backscattered signals may be multiplied in the mixer, resulting in Equation 4.

$$s_n(t, l) = y_n^*(t, l) x_n(t, l) \quad \text{[Equation 4]}$$

( )* refers to the conjugate transpose. It may be a beat signal since two key terms for vehicular positioning remain in the forms of vibrating frequencies defined as beat rates (BRs). The details are given in the below.

For an example, A pair of the relative distance and angle to the tag $\{r_n, \theta_n\}$ may be equivalently translated into the relative position of the n-th antenna, denoted by $z_n$. Obtaining $z_n$ may be based on Equation 5.

$$z_n = -r_n (\cos\theta_n, \sin\theta_n)^T, n = 1, \cdots N. \quad \text{[Equation 5]}$$

For an example, the antennas' absolute positions, denoted by $\{p_n\}_{n=1}^N$, may be obtained by shifting the origin of the 2D coordinates into the tag's absolute position $p_{tag}$ acquired by backscatter communication, namely, $\{p_n\}_{n=1}^N = p_{tag} + \{z_n\}_{n=1}^N$. For example, every antenna may take an average of results about its absolute location obtained from the steps above, after processing the steps of positioning described above.

For example, it may be assumed that the backscatter communication is error-free and accurate $P_{tag}$ is always available. As a result, the vehicular positioning may be reduced to the problem of discovering suitable frequency and phase modulation functions F(t) and $P_n(l)$ in Equation 1, enabling to distill $\{r_n, \theta_n\}_{n=1}^N$ from $\{s_n(t,l)\}_{n=1}^N$.

Figure 14:
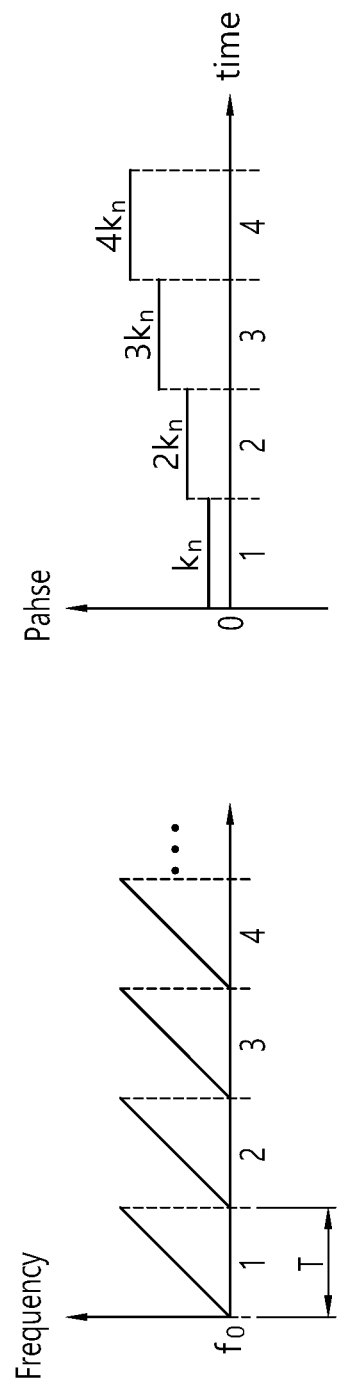
FIG. 14 shows a type of JFPM waveform for a low mobility scenario.

Hereinafter, two types of JFPM waveform will be described below. There may be two types of JFPM waveform which this disclosure introduces that the two types of JFPM are designed for low and high mobility driving scenarios, respectively. FIG. 14 shows a type of JFPM waveform for a low mobility scenario. For an example, in a low mobility scenario, the velocity of vehicle may be very slow (e.g., parking or traffic jam) and the resultant Doppler Effect may be marginal. Thus, it may be treated as a stationary case (i.e., v=0), leading to proposing the following JFPM waveform of type I shown in FIG. 14. First, obtaining the frequency modulation may be based on Equation 6.

$$F(t) = 2\pi f_0 t + \pi \alpha t^2 \quad \text{[Equation 6]}$$

$f_0$ may be the fundamental and/or start frequency and $$\alpha = \frac{B}{T}$$

may denote the slope that is the ratio of signal sweep bandwidth B and sweep duration T. The resultant frequency may be $f_0 + \alpha t$ which is linear increasing in each sweep. Second, obtaining the phase modulation function may be based on Equation 7.

$$P_n(l) = 2\pi k_n l \quad \text{[Equation 7]}$$

The phase modulation is constant during one sweep (0≤t≤T) but linearly increasing of the sweep index l. For example, here, $k_n$ may represent the rate of phase modulation which should be less than 1 to avoid ambiguity. Each antenna may use different $k_n$ playing a role as a label of signals originated from antenna n. For example, equally separated multiple signal paths could be differentiated with the proposed phase modulation Equation 7, leading to better positioning accuracy.

Given the type I waveform, the received beat signal may be rewritten by plugging Equation 6 and Equation 7 into Equation 4. For the sake of brevity, this disclosure will focus on 1-st antenna. After ignoring the high order term, obtaining the beat signal approximately is based on Equation 8.

$$s_1(t, l) \approx b(\beta_{1,1} e^{j\left(2\pi \alpha \frac{2r_1}{c}\right)t} + \sum_{n=2}^N \beta_{n,1} e^{j\left(2\pi \alpha \frac{r_1 + r_n}{c}\right)t} e^{j(2\pi(k_1 - k_n))l} + \tilde{w}_1 \beta_{1,1} = \quad \text{[Equation 8]}$$

$$A_{1,1} e^{j\left(\frac{4\pi f_0 r_1}{c}\right)} \text{ and } \beta_{n,1} = A_{n,1} e^{j\left(\frac{2\pi f_0(r_1 + r_n)}{c}\right)}$$

may be constant coefficients for the monostatic signal of $x_1(t,l)$ and the bistatic signals of $x_n(t,l)$, respectively. The term $\tilde{w}_1$ may represent the thermal noise after passing the mixer. For example, there may be two kinds of BRs embedded in Equation 8 as aforementioned in above. The first one, determined by the propagation distances $2r_1$ and $\{r_1 + r_n\}$, may affect the periodicity in variable $t$. It may be defined as a BR-in-$t_{(BRiT)}$. It may be possible to extract multiple BRiTs via a one-dimensional Fourier transform (1D-FT) over $t$. For example, the first BR may be related with a propagation distance of the signal. On the other hand, if there exist such antennas $n_1$ and $n_2$ satisfying $r_{n_1} = r_{n_2}$, both of the corresponding signals may arrive simultaneously, making it difficult to differentiate them via the 1D-FT. For example, a BR-in-l (BRiL) may be utilized to overcome the limitation, defined as the periodicity in variable $l$ represented by the difference of phase modulation rates $k_1 - k_n$. It is shown that each bistatic signal has different BRiL while monostatic signal has no BRiL. As a result, to decompose all monostatic and bistatic signals via two-dimensional FT (2D-FT) over $t$ and $l$ may be always available. For example, the second BR; $e^{j(2\pi(k_l - k_n))l}$ may act as an identifier informing about where the signal is transmitted from. The detailed procedure will be described below.

1) Digitalization

Digitalize the beat signal $s_1(t,l)$ by analog-to-digital converter (ADC) with sampling rate $f_{samp}$ as Equation 9.

$$s_1(q, l) = \sum_{n=1}^{N} \beta_{n,1} \cdot b \cdot e^{jF'_{n,1}q} e^{jP'_{n,1}l} \qquad \text{[Equation 9]}$$

$q \in \{1, \ldots, Q\}$ with $Q = Tf_{samp}$ number of sampling points in one sweep, $$F'_{n,1} = 2\pi\alpha \frac{r_1 + r_n}{cf_{zamp}}$$

and $P'_{n,1} = 2\pi(k_1 - k_n)$ may be the corresponding BRiT and BRiL, respectively.

2) 2D-FT:

For example, using the digitalized beat signal Equation 9, computing 2D-FT may be based on Equation 10.

$$S_1(F, P) = FT_{2D}(\{s_1(q, l)\}, F, P) = \qquad \text{[Equation 10]}$$

$$\sum_{l=1}^{L} \sum_{q=1}^{Q} \sum_{n=1}^{N} \beta_{n,1} b \cdot e^{j\left(F'_{n,1} - \frac{2\pi F}{Q}\right)q} e^{j\left(P'_{n,1} - \frac{2\pi P}{L}\right)l}$$

$1 \le F \le Q$ and $1 \le P \le L$. Note that the period of one sweep may be very short ($T \le 30$ μs) compared with the duration of one backscatter bit. Therefore, when $b=1$ (i.e., reflective state of tag), the 2D-FT may be available since sufficient number of sweeps ($L \gg 1$) can be collected.

3) Distance Estimation:

In the 2D-FT matrix $s_1$, up to N number of peaks can be detected as $$\{(F_{peak}^{(n)}, P_{peak}^{(n)})\} = \left\{\left(\frac{F'_{n,1}Q}{2\pi}, \frac{P'_{n,1}L}{2\pi}\right)\right\}_{n=1}^{N}.$$

Note that the reader may easily match each peak to the corresponding propagation distances by using BRiLs $\{P'_{n,1}\}$. For example, the distances $\{r_n\}$ may be estimated via the counterpart BRiTs, based on the one-to-one matching. Obtaining the distances may be based on Equation 11.

$$\begin{cases} r_1 = \dfrac{c \cdot F_{peak}^{(1)}}{2\alpha T} \\ r_n = \dfrac{c \cdot F_{peak}^{(n)}}{\alpha T} - r_1, \; n = 2, \cdots, N. \end{cases} \qquad \text{[Equation 11]}$$

4) Angle Estimation:

For example, the locations of two antennas and the backscatter tag may form a triangle as shown in FIG. 12. Given the estimated $\{r_n\}$ in Equation 11, the counterpart angles $\{\theta_n\}$ may be calculated by solving the following equation of law-of-sines on the triangle (Equation 12).

$$\frac{(n-1)d}{\sin(\theta_1 - \theta_n)} = \frac{r_n}{\sin\theta_1} = \frac{r_1}{\sin(\pi - \theta_n)} \qquad \text{[Equation 12]}$$

where d may be the spacing between adjacent antennas.

5) Transformation to 2D-Coordinates:

Given $\{r_n\}$ and $\{\theta_n\}$, the antennas' positions $\{z_n\}$ can be calculated by Equation 5.

For an example of this disclosure, numbers of antennas may affect MAC gain and/or BC gain. Due to the nature of backscatter channels, the gains of multiple access channel (MAC) and broadcasting channel (BC) may coexist as follows:

MAC gain: Recall that every antenna at the reader may receive not only a monostatic signal but also (N−1) bistatic signals. When estimating the angle $\theta_n$, it is possible to make $$\frac{\binom{N}{2}}{N} = \frac{(N-1)}{2}$$

relevant triangle combinations. It is equivalent to (N−1) equations according to Equation 12, showing that more DoFs may be given as N increases.

BC gain: A signal originated from the n-th antenna is broadcast to the other antennas. Following the above procedure with N beat signals $\{s_n(t,l)\}_{n=1}^{N}$ makes N versions of $z_n$, which may help mitigate estimation errors by averaging them out.

For the type I waveform shown in FIG. 14 to be effective, to give a few design criterion may be essential. For example, first, consider the maximum allowable distance to avoid ambiguity, denoted by $r_{max}$ which may be limited by two constraints: sampling rate $f_{samp}$ and the duration of one sweep T. Specifically, the bandwidth of beat signal depends on the maximum detectable distance, $$\left(\text{i.e., } B_{beat} = \frac{\alpha 2 r_{max}}{c}\right).$$

For example, the maximum detectable distance may be further limited by ADC sampling rate and result in the ranging limitation:

$$B_{beat} \le f_{samp} \Leftrightarrow r_{max} \le \frac{f_{samp}c}{2\alpha}.$$

Besides, the maximum allowable delay for backscattered signals should be less than T and thus $$r_{max} \le \frac{cT}{2},$$

since a sequence of sweeps is transmitted by each antenna. Combining these two provides the following proposition; Maximum Allowable Distance, Optimal Phase Modulation in the Type I Waveform.

Maximum Allowable Distance:

For example, given bandwidth B, sweep duration T, and sampling rate $f_{samp}$, the maximum allowable distance between the tag and each antenna may be limited by $$r_{max} = \min\left\{\frac{f_{samp}c}{2\alpha}, \frac{cT}{2}\right\}.$$

Second, it may be important to determine key parameters of the phase modulation functions $\{P_n(l)\}$ of Equation 7, namely, modulation rates $\{k_n\}$ and the number of sweeps L. For example, these may be determined by resolution, defined as the minimum separation between adjacent BRiLs to differentiate multiple peaks in the same distance. Specifically, the resolution depends on L such that two BRiLs can be differentiated if the difference is larger than $$\frac{2\pi}{L}.$$

Therefore, Equation 13 should be satisfied.

$$\frac{2\pi}{L} < \min_{n,i} |P'_{n,1} - P'_{i,1}| \le \frac{2\pi}{N} \quad \text{[Equation 13]}$$

Here, the equality holds when adjacent BRiLs are equally separated, leading to the following proposition.
Optimal Phase Modulation in the Type I Waveform:

For example, in the type I waveform, the optimal phase modulation function achieving the maximum resolution may be based on Equation 14.

$$P_n^*(l) = \frac{2\pi n}{N} l \quad \text{[Equation 14]}$$

Given Equation 14, a signal differentiation can be guaranteed when the number of sweeps is larger than the number of the reader's antenna (i.e., L>N).

Figure 15:
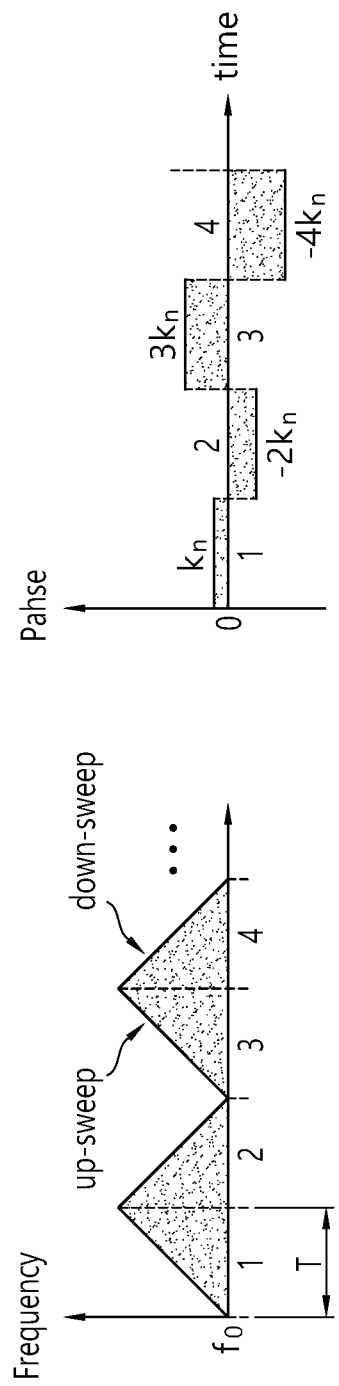
FIG. 15 shows a type of JFPM waveform for a high mobility scenario.

FIG. 15 shows a type of JFPM waveform for a high mobility scenario. For example, in a high mobility scenario, as the vehicle is moving faster, the resultant Doppler shift may become significant. For example, because of the Doppler shift, the frequency of signals may be vibrated. For example, applying the type I waveform may bring about the degradation of the positioning accuracy due to the distortion specified in Equation 3 and a vibration caused by the Doppler shift. It calls for designing a JFPM waveform of type II for a high mobility scenario to compensate the distortion and the vibration. For example, a key idea may be to use different frequency and phase modulations functions in odd and even sweeps, making it possible to cancel out each Doppler shift assuming that it is identical to each other. FIG. 15 illustrates the new JFPM waveform of type II. Specifically, for example, the frequency modulation may adopt the triangular waveform such that odd sweeps ($l_{odd} \in \{1,3,\ldots\}$) may have a linear increasing slope, while even sweeps ($l_{even} \in \{2,4,\ldots\}$) may have a linear decreasing slope. For the phase modulation, for example, the rate $\{k_n\}_{n=1}^N$ for odd sweeps may be designed to be positive, while those of even sweeps may be negative.

For example, given the type II waveform, the 1-st antenna's beat signal of an odd sweep may be approximately written by ignoring high-order terms as Equation 15.

$$s_1(t, l_{odd}) \approx b \left[ \tilde{\beta}_{1,1} e^{j\left(2\pi x \frac{2r_1}{c} + 2\pi f_0 \frac{2v\cos\theta_1}{c}\right)t} e^{j\left(2\pi f_0 \frac{2v\cos\theta_1}{c} T\right) l_{odd}} + \right. \quad \text{[Equation 15]}$$

-continued
$$\left. \sum_{n=1}^{N} \tilde{\beta}_{n,1} e^{j\left(2\pi x \frac{2r_1 + r_n}{c} + 2\pi f_0 \frac{v(\cos\theta_1 + \cos\theta_n)}{c}\right)t} \times \right.$$

$$\left. e^{j\left(2\pi(k_1 - k_n) + 2\pi f_0 \frac{v(\cos\theta_1 + \cos\theta_n)}{c} T\right) l_{odd}} \right] + \tilde{w}_1$$

$$\tilde{\beta}_{1,1} = \beta_{1,1} e^{-j\left(2\pi f_0 \frac{2v\cos\theta_1}{c} T\right)} \text{ and } \tilde{\beta}_{n,1} =$$

$$\beta_{n,1} e^{-j\left(2\pi f_0 \frac{v(\cos\theta_1 + \cos\theta_n)}{c} T\right)}.$$

The beat signal of an even sweep $s_1(t_n l_{even})$ may be written by replacing the positive slope α and phase modulation rates $\{k_n\}$ in Equation 15 with negative slope −α and rates $\{-k_n\}$, respectively. For example, BRiT and BRiL in both odd and even sweeps' beat signals may be distorted by the same levels of the Doppler shifts, which can be eliminated if those in even and odd sweeps are separately estimated. For example, first, compute 2D-FTs with Equation 10 for even and odd sweeps separately, each of which the coordinates of peaks are shifted as much as the corresponding Doppler shifts. Next, for example, by computing the difference between relevant peaks' coordinates, BRiT and BRiL with no Doppler shifts can be refined, helping estimate accurate relative distances and angles of each antenna from the backscatter. For example, the other steps excluding the above may be the same as those for a low mobility scenario.

For an example, in the type II waveform, only a half points may be given for 2D-FT than the type I due to the separated computations in odd and even sweeps. It may result in the half resolution, which may be the cost paid for mitigating the Doppler shift such that the inequality Equation 13 becomes $$\frac{\pi}{\frac{N}{2}} < \frac{2\pi}{N}.$$

As a result, the design criterion of the number of sweeps L may be revised as follows.

For example, in the type II waveform, the signal differentiation can be guaranteed when the number of sweeps should be strictly larger than the twice number of antenna (i.e., L>2N).

For an example, $f_0$ may be 24 GHz, B may be 200 MHz, T may be $30^{\mu s}$, $f_{samp}$ may be 5 MHz, and $A_{m,n}$ may be $10^{-1}$. For example, the transmit signal-to-ratio (SNR) and the number of sweeps L may be 20 (dB) and 80, respectively. For example, the performance metric may be a positioning error defined as the average Euclidean squared distance between estimated and ground true antennas' positions.

Figure 16:
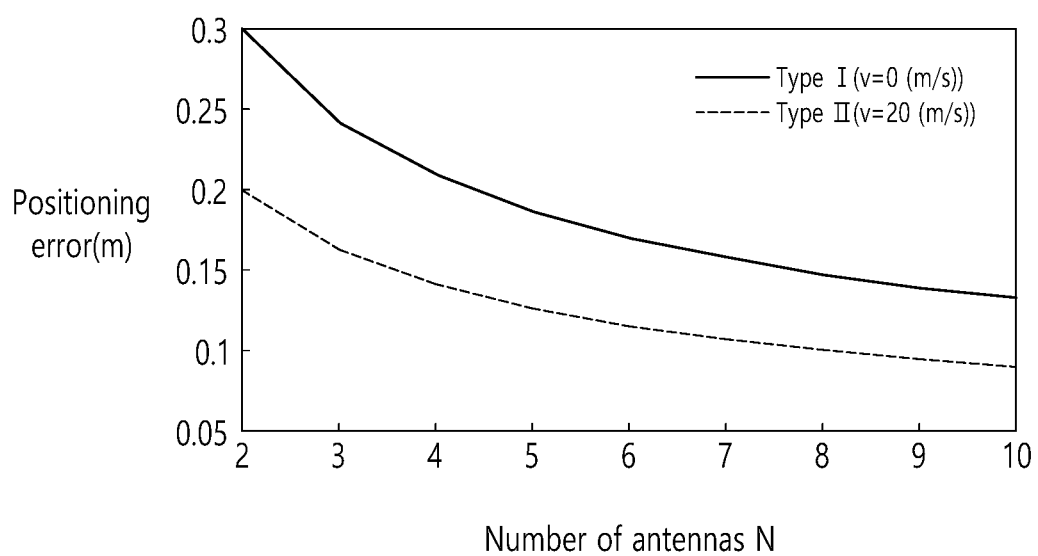
FIG. 16 represents the effect of number of the reader's antennas on positioning error for the JFPM waveforms of type I and type II.

FIG. 16 represents the effect of number of the reader's antennas N on positioning error for the JFPM waveforms of type I and type II. For example, the vehicle's velocity v may be set to 0 and 20 (m/s) for the type I and type II, respectively. It is described above that the positioning error may be reduced when more antennas are deployed due to MAC and BC gains and finally almost may reach 0:1 (m), which is 3GPP's vehicular positioning requirement stated. In addition, the error difference between the two may be around 0:05 (m) regardless of the antenna number, referring to the resolution loss paying for the cost of eliminating Doppler effect as discussed above.

Figure 17:
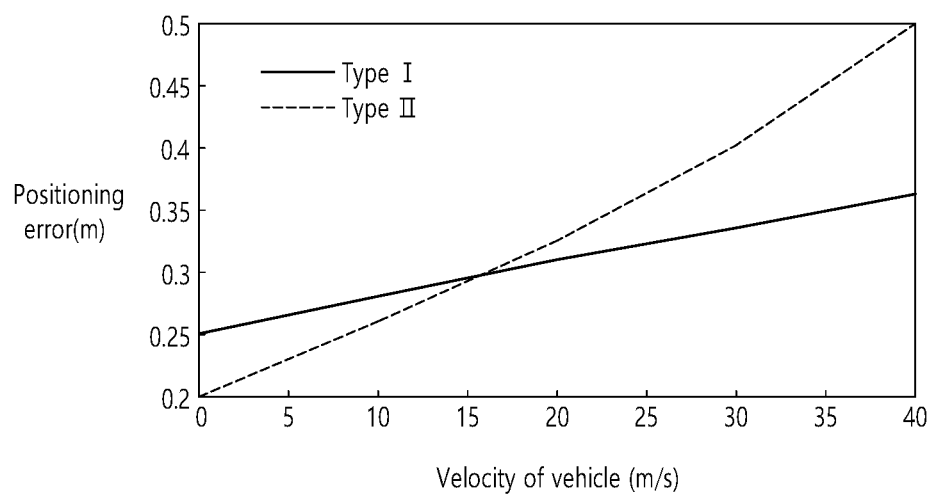
FIG. 17 represents the positioning errors of the type I and type II waveforms under different velocity settings.

For example, FIG. 17 represents the positioning errors of the type I and type II waveforms under different velocity settings ranging from 0 to 40 (m/s) when two antennas are deployed at reader (N=2). In case of low velocity, for an example, the type I may outperform the type II because the Doppler shift may be negligible and its cancelation may be unnecessary in this case. For example, as the velocity becomes higher, on the other hand, the Doppler shift may become critical, yielding that the performance degradation of the type II may be less than the that of the type I with the crossing point of v which may be 15 (m/s). It may provide the selection between the two depending on velocity information.

For example, a network can include a first entity based on N multi-antennas installed in a vehicle, and a second entity. For example, the first entity may be at least one of a user equipment (UE), a hand held UE, a vehicle, a backscatter reader, an UE including a backscatter reader, and/or an apparatus. For example, the second entity may be at least one of a backscatter tag, a base station, a RRH, a base station including a backscatter tag, and/or a RRH including a backscatter tag. For example, the second entity may include a second node or a second apparatus.

Figure 18:
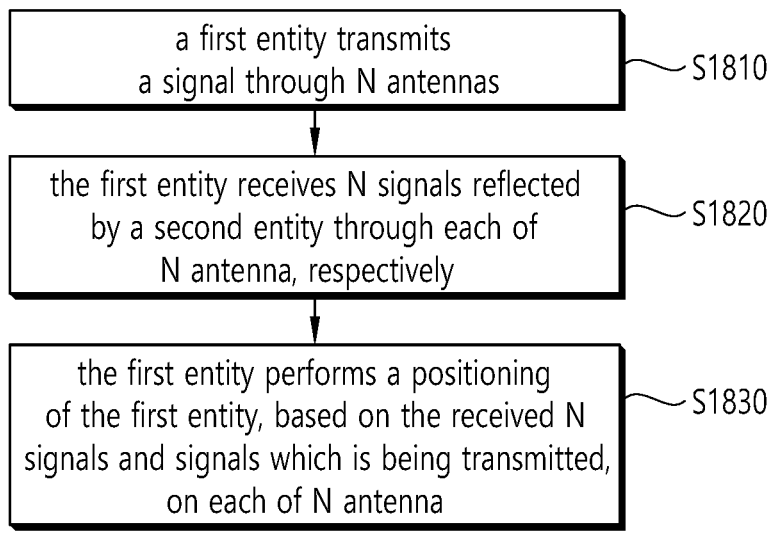
FIG. 18 represents a method by a first apparatus for performing a positioning.

FIG. 18 represents a method by a first apparatus for performing a positioning.

In step S1810, a first entity may transmit a signal through N antennas. For example, the signal may be a JFPM signal. For example, the signal may be a type I signal. For example, the signal may be a type II signal.

In step S1820, the first entity may receive N signals reflected by a second entity, respectively. For example, the N signals may represent signals that a number of the signal is N. For example, the signal which is transmitted from the antennas returns to the first entity after being reflected by the second entity.

In step S1830, the first entity can perform a positioning of the first entity, based on the received N signals and signals which is being transmitted. For example, the positioning may be based on a tag ID of a second entity.

Figure 19:
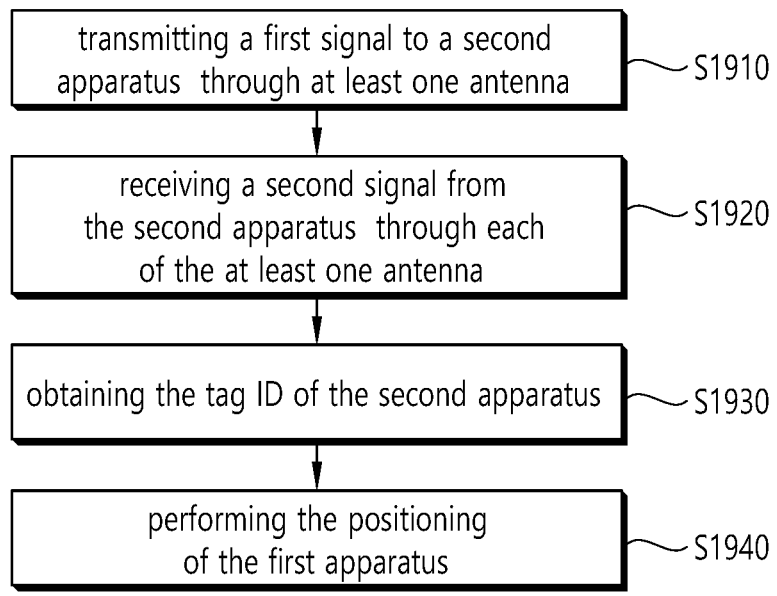
FIG. 19 represents a method by a first apparatus for performing a positioning.
Figure 20:
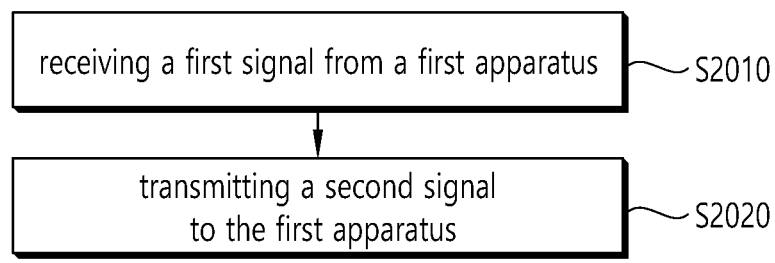
FIG. 20 represents a method of second apparatus for supporting a positioning.

For example, FIG. 19 represents a method by a first apparatus for performing a positioning.

In step S1910, the first apparatus transmits a first signal to a second apparatus through at least one antenna. For example, the first signal may have a type I JFPM waveform or a type II JFPM waveform. In step S1920, the first apparatus receives a second signal from the second apparatus through each of the at least one antenna, wherein the second signal includes a bit related with a tag identifier (ID) of the second apparatus. In step S1930, the first apparatus obtains the tag ID of the second apparatus, which is related with absolute location information of the second apparatus, based on the bit. In step S1930, the first apparatus performs the positioning of the first apparatus, based on the first signal, the second signal, and the tag ID of the second apparatus.

Figure 23:
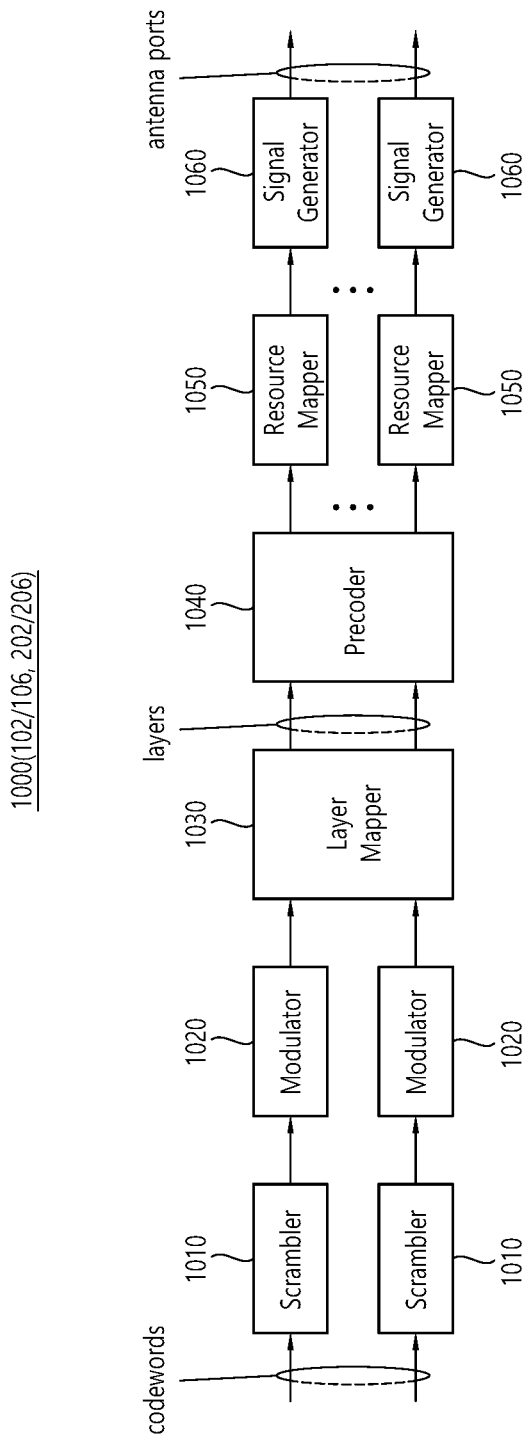
FIG. 23 shows a signal process circuit for a transmission signal, in accordance with an embodiment of the present disclosure.

For example, FIG. 23 represents a method of second apparatus for supporting a positioning.

In step S2010, the second apparatus receives a first signal from a first apparatus. In step S2020, the second apparatus transmits a second signal to the first apparatus, wherein the second signal includes a bit related with a tag identifier (ID) of the second apparatus.

Figure 21:
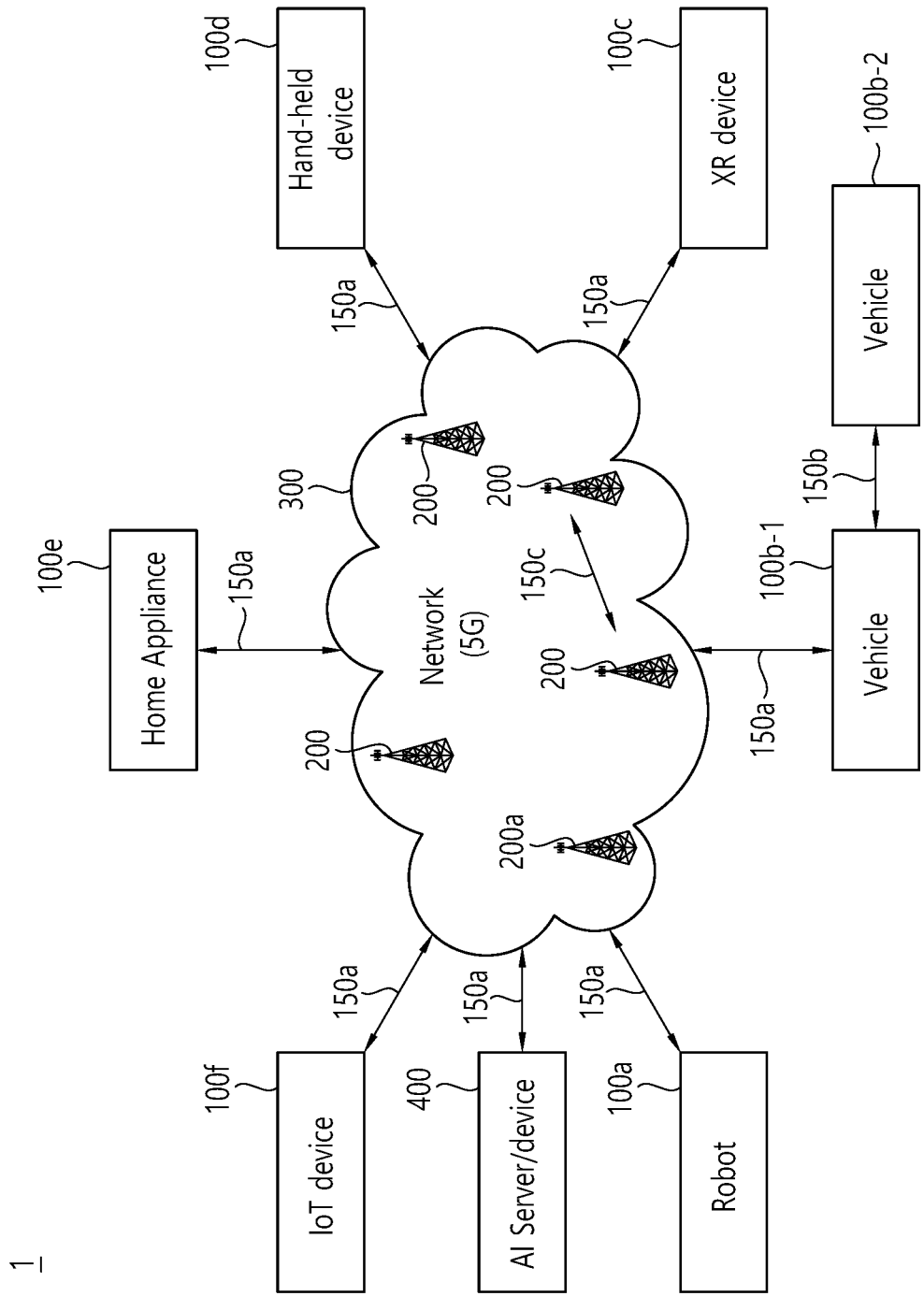
FIG. 21 shows a communication system 1, in accordance with an embodiment of the present disclosure.

FIG. 21 shows a communication system 1, in accordance with an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
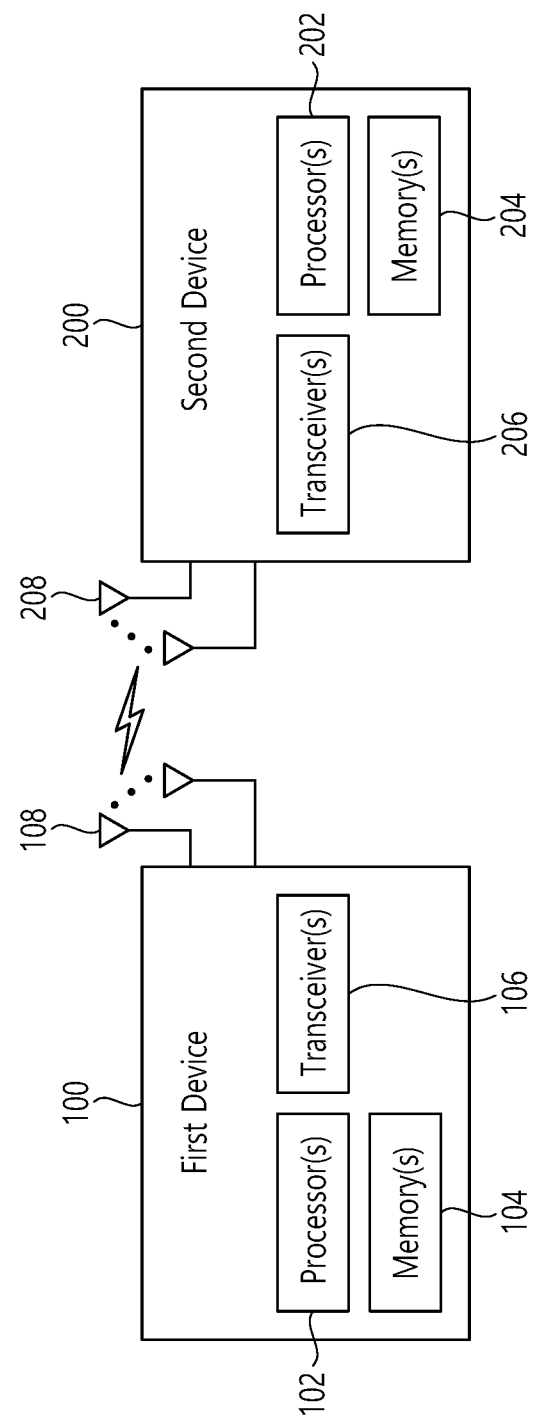
FIG. 22 shows wireless devices, in accordance with an embodiment of the present disclosure.

FIG. 22 shows wireless devices, in accordance with an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 23 shows a signal process circuit for a transmission signal, in accordance with an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
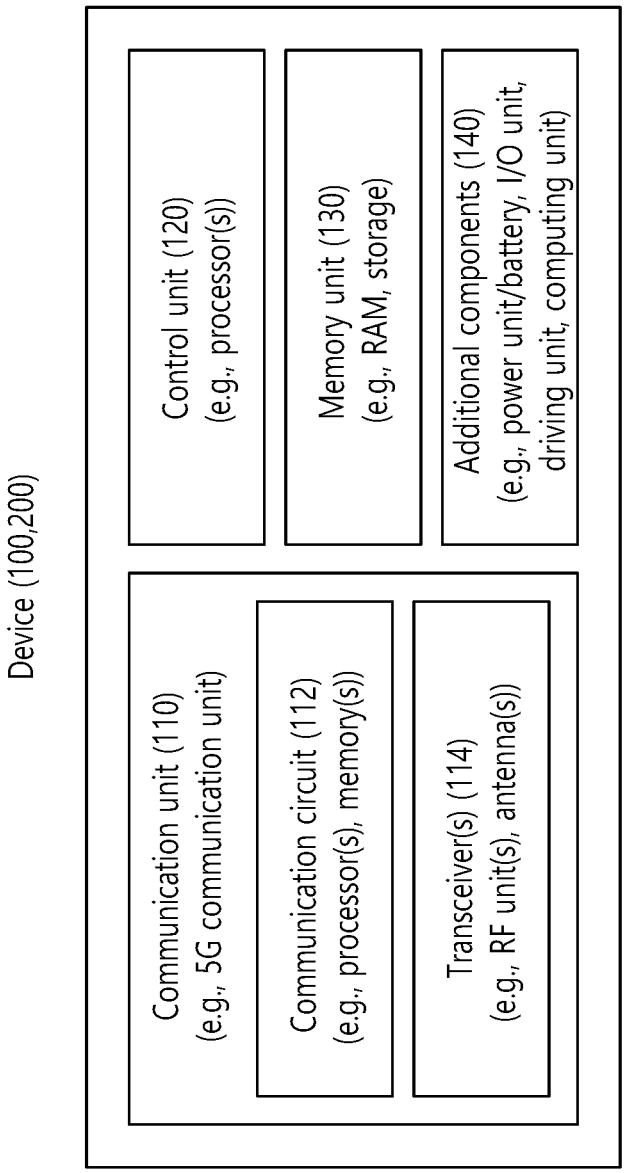
FIG. 24 shows a wireless device, in accordance with an embodiment of the present disclosure.

FIG. 24 shows another example of a wireless device, in accordance with an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
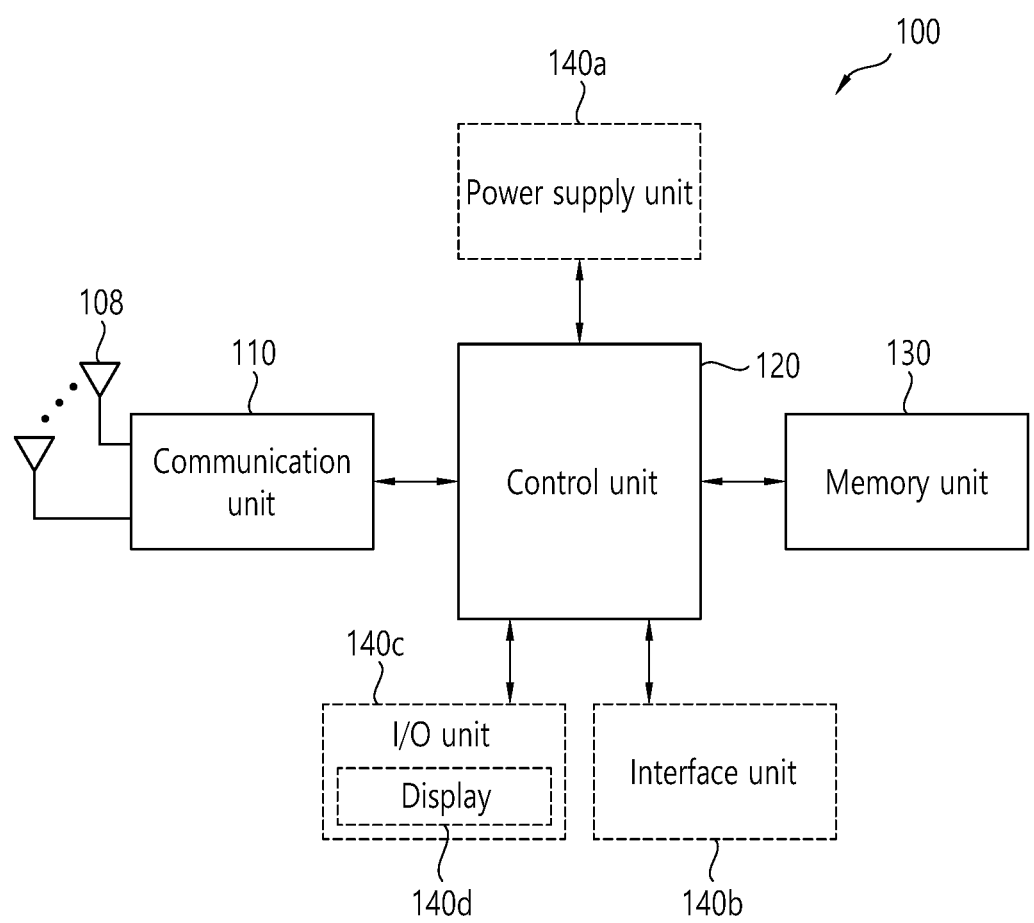
FIG. 25 shows a hand-held device, in accordance with an embodiment of the present disclosure.

FIG. 25 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 26:
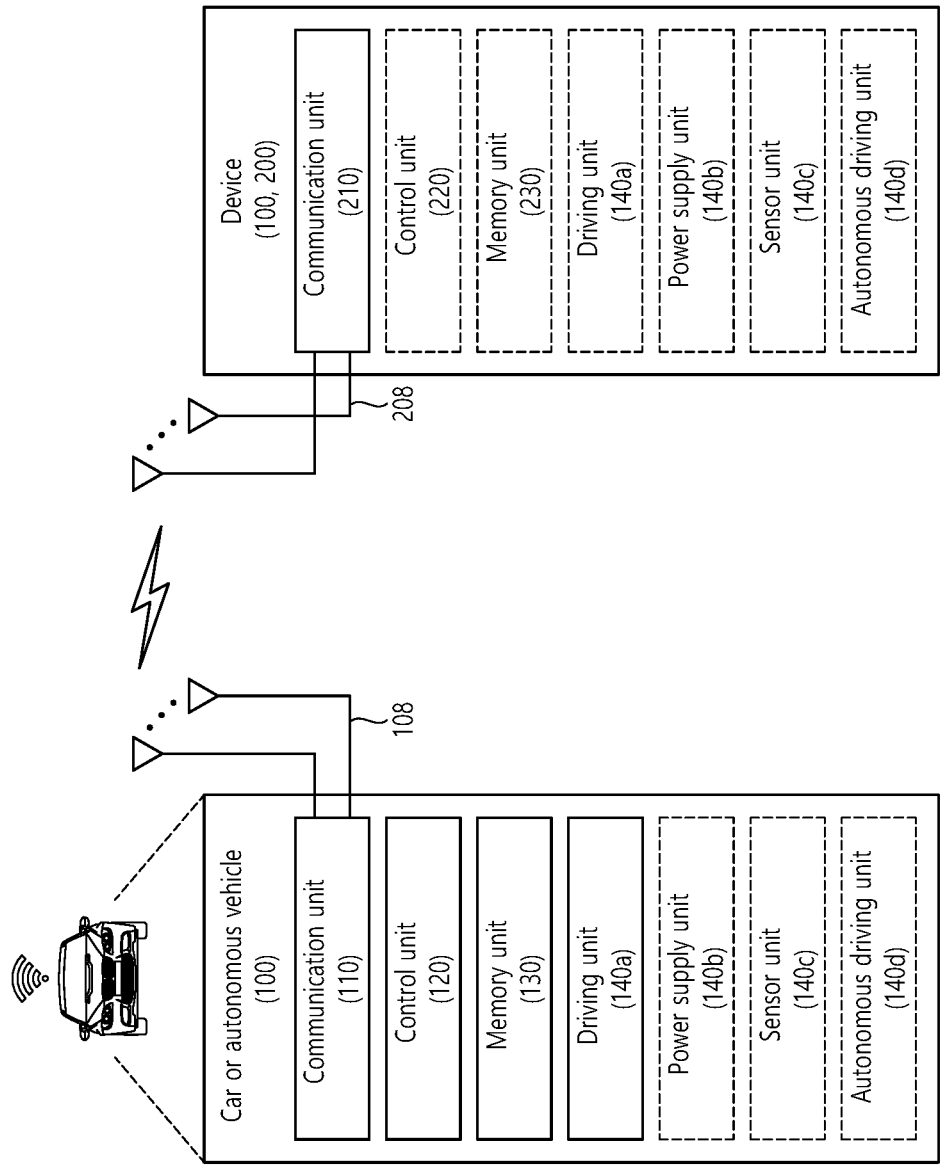
FIG. 26 shows a car or an autonomous vehicle, in accordance with an embodiment of the present disclosure.

FIG. 26 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method of performing a positioning of a first apparatus by the first apparatus, the method comprising:
    transmitting a first signal to a second apparatus through at least one antenna;
    receiving a second signal from the second apparatus through each of the at least one antenna, wherein the second signal includes a bit related with a tag identifier (ID) of the second apparatus;
    obtaining the tag ID of the second apparatus, which is related to absolute location information of the second apparatus, based on the bit; and
    performing the positioning of the first apparatus, based on the first signal, the second signal, and the tag ID of the second apparatus,.
    wherein a frequency and a phase of the second signal are the same frequency and phase of the first signal.

2. The method of claim 1, wherein a total number of the first signal is the same as the number of the at least one antenna.

3. The method of claim 1, wherein a number of the second signal is the same as the number of the at least one antenna.

4. The method of claim 1, wherein a frequency of the first signal is linearly increased from a start frequency in proportion to time, repeated for every sweep duration.

5. The method of claim 4,
    wherein the phase of the first signal is constant during the sweep duration, and
    wherein the phase of the first signal is increased by a size of a first phase for every sweep duration.

6. The method of claim 1, wherein the frequency of the first signal is linearly increased from a start frequency in proportion to time during a first sweep duration, linearly decreased to the start frequency in proportion to time during a second sweep duration, and repeated for every two sweep durations.

7. The method of claim 6,
    wherein the phase of the first signal is constant during the sweep duration,
    wherein a size of the phase of the first signal is increased by a size of a first phase for every sweep duration, and
    wherein a sign of the phase of the first signal is reversed for every sweep duration.

8. The method of claim 1, further comprising:
    obtaining a beat rate (BR) which is a vibrating frequency of a beat signal, by multiplying the first signal and the second signal through a mixer,
    wherein the beat signal is a result of the multiplying of the first and the second signal, and
    wherein the positioning of the first apparatus is performed based on the BRs.

9. The method of claim 1, wherein a total number of sweep duration repetitions is larger than a number of the at least one antenna.

10. The method of claim 8, further comprising:
    digitalizing the beat signal through an analog to digital converter(ADC), wherein the positioning of the first apparatus is based on the digitalized beat signal.

11. The method of claim 10, further comprising:
    performing a two-dimensional Fourier-Transformation (2D_FT) using the digitalized beat signal, wherein the positioning of the first apparatus is based on a result of the 2D_FT.

12. The method of claim 11, further comprising:
    based on the result of the 2D_FT, estimating a distance and an angle between the at least one antenna and the second apparatus; and
    based on the distance and the angle between the at least one antenna and the second apparatus, estimating a relative position of the at least one antenna from the second apparatus,
    wherein the positioning of the first apparatus is based on the relative position of the at least one antenna.

13. A first apparatus for performing wireless communication, the first apparatus comprising:
- at least one memory for storing instructions;
- at least one transceiver; and
- at least one processor connected to the at least one memory and the at least one transceiver,
- wherein the processor executes the instructions to:
- transmit a first signal to a second apparatus through at least one antenna;
- receive a second signal from the second apparatus through each of the at least one antenna,
- wherein the second signal includes a bit related with a tag identifier (ID) of the second apparatus;
- obtain the tag ID of the second apparatus, which is related to absolute location information of the second apparatus, based on the bit; and
- perform a positioning of the first apparatus, based on the first signal, the second signal, and the tag ID of the second apparatus,
- wherein a frequency and a phase of the second signal are the same frequency and phase of the first signal.

14. An apparatus configured to control a first user equipment (UE), the apparatus comprising:
- at least one processor;
- at least one memory operably connectable to the at least one processor and storing instructions,
- wherein the at least one processor executes the instructions to:
- transmit a first signal to a second apparatus through at least one antenna;
- receive a second signal from the second apparatus through each of the at least one antenna,
- wherein the second signal includes a bit related with a tag identifier(ID) of the second apparatus;
- obtain the tag ID of the second apparatus, which is related to absolute location information of the second apparatus, based on the bit; and
- perform a positioning of the first apparatus, based on the first signal, the second signal, and the tag ID of the second apparatus,
- wherein a frequency and a phase of the second signal are the same frequency and phase of the first signal.

* * * * *